Aug. 9, 1932.    G. B. EGGERT    1,871,261
DOUGH DIVIDER
Filed Aug. 17, 1931

INVENTOR
GUSTAV B. EGGERT
BY
ATTORNEY

Patented Aug. 9, 1932

1,871,261

UNITED STATES PATENT OFFICE

GUSTAV B. EGGERT, OF SAGINAW, MICHIGAN, ASSIGNOR TO BAKER PERKINS COMPANY, INC., OF SAGINAW, MICHIGAN, A CORPORATION OF NEW YORK

DOUGH DIVIDER

Application filed August 17, 1931. Serial No. 557,495.

This invention relates to machines for dividing dough and other soft plastic materials into pieces of predetermined volume and weight. It has for its object the provision of an improved mechanism for actuating the ram or plunger which forces dough into the measuring pocket or receptacle. In particular it has to do with those machines having a ram or plunger to force dough into a measuring pocket, adjustable in volume, the plunger having a working stroke varying in length according to the adjusted volume of the measuring pocket, a positively actuated driving element, such as a crank or eccentric, which has a constant amplitude of reciprocatory motion, and a resilient power-transmitting connection between the driving element and the plunger.

It has for its object to provide an improved operating connection between the driving element and the ram, such operating connection including the resilient element necessary to permit of the ram traveling through a variable stroke.

In prior machines of this general type there has been provided a resilient spring member in the connection between the source of power and the ram. When the measuring pocket of the divider was adjusted to receive the maximum amount of dough, the plunger would travel to the full limit of its working stroke and encounter the minimum of resistance. When the pocket was adjusted to receive a smaller amount of dough, the plunger would travel forward until the pocket was filled with dough. When this point was reached the spring element would yield, and the remaining travel of the driving member would be taken up in stressing the spring member. It followed that the distortion of the spring member, and hence the pressure exerted by the plunger on the dough in the pocket, was greater on a small piece of dough than on a large dough-piece.

This condition is the opposite of that to be desired. A large volume of dough in a deeper pocket and with greater internal frictional resistance requires a greater pressure than does a small volume of dough to compress it to the same density. If the density of a large dough piece is not the same as that of a smaller, the weights of the various sized dough pieces will not be proportional to the volume of the measuring pocket.

Furthermore, it is desirable to compress the dough in the measuring pocket to the maximum density possible without injury to its life and texture. When the dough is compressed to this degree the effect of a varying gas content upon the density of successive dough pieces is reduced to a minimum, and the divided pieces will be closely uniform in weight.

A machine of the type described above could not be made to produce uniformly accurate dough pieces of all the sizes within its range. To build the machine to compress large loaves to the desired maximum degree, when the plunger was traveling its full stroke, resulted in excessive compression and punishment of the dough when the machine was dividing small loaves. If the machine was made to exert the desired pressure on small loaves a lower compression and inaccurate measuring of the larger loaves resulted. Because of this inherent difficulty the prior machines necessarily performed most accurately when producing some one size of loaf, and were either inaccurate when dividing large loaves, or punished the small sizes excessively, or sometimes presented both disadvantages.

This invention, by a new arrangement of the resilient driving connection between the source of power and the plunger, provides that the force of the resilient member is applied to the plunger-actuating members through a crank connection so located with respect to its pivot center that the effective lever arm of the connection increases in length as the plunger approaches its limit of travel on its working stroke. Thus the greater pressure transmitted through the driving connection at its limit of travel for a short stroke is exerted through a short lever arm, and the lower pressure for a long stroke is applied through a longer lever arm. In this way the length of the lever arm through which the force is applied to the plunger increases as the length of stroke increases, offsetting the greater pressure of the resilient driving connection, which increases as the working stroke becomes shorter. With an appropriate design and selection of parts it is possible to build a dough divider according to this invention in which the unit pressure on the dough will be proportional to the size of the pieces being scaled. Therefore, it is possible to automatically compress each size of loaf throughout the range of adjustment of the measuring pocket to the desired degree to provide closely accurate and consistent scaling while avoiding excessive punishment of the dough.

Several concrete embodiments of my invention will now be described.

Referring to the drawing.

Figure 1:
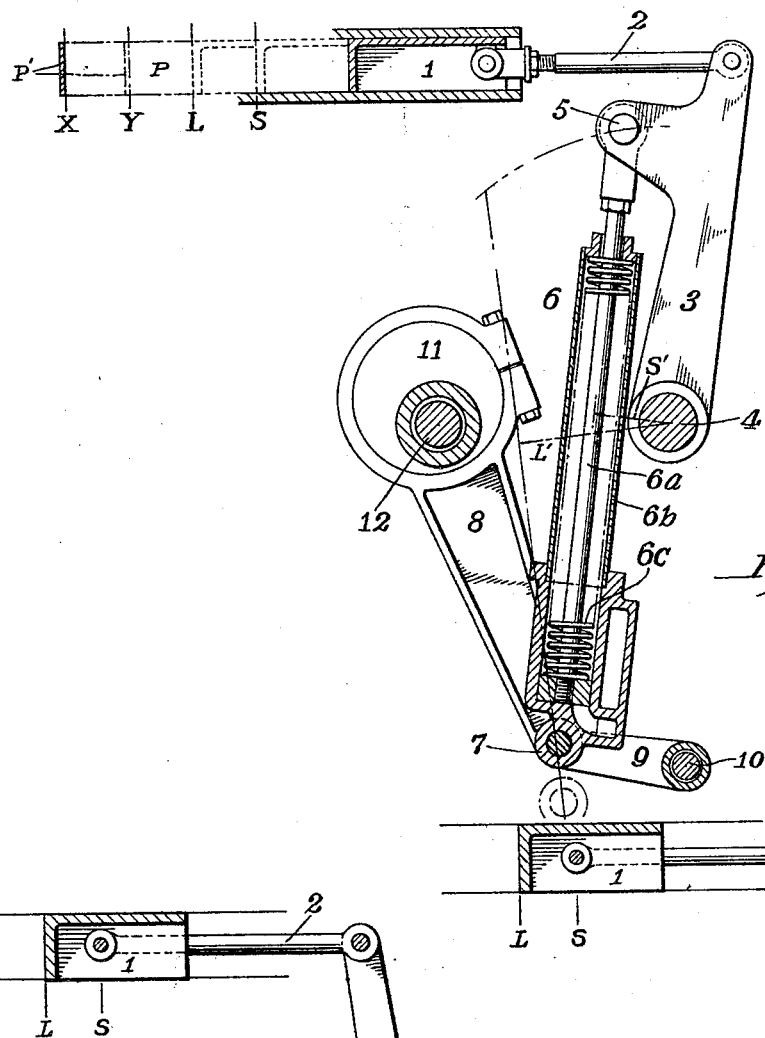
Fig. 1 is a diagrammatic part-sectional side elevation of one form of the invention, in which the extra travel of the driving member is taken up in the stretching of the resilient connection to the plunger.

The structure shown in Fig. 1 comprises the following elements:

The plunger or ram 1 is arranged to reciprocate beneath the bottom of a dough reservoir (not shown) of known type. On its working stroke it forces dough into a measuring pocket P, shown diagrammatically, provided with an end wall P', which is adjustable to vary the volume of the dough pieces to be measured. The position X of end wall P' is that for a large loaf, its position Y is that for a small loaf. A connecting rod 2 is pivotally connected at one end to the ram 1 and at its other end to a rocker arm 3. The rocker arm 3 is journalled at its lower end to a fixed pivot shaft 4. Pivotally connected to the rocker arm 3 at point 5 is a resilient stretchable connecting member 6 comprising a rod 6a movable endwise within a cylindrical casing 6b, and connected at its lower end to compress a helical spring 6c when the member 6 is elongated. Member 6 is pivotally connected at its lower end 7 to a connecting rod 8 which is in turn connected to one end of a short rocker arm 9. Rocker arm 9 is pivoted at its other end to a fixed shaft 10 and acts as a guide to confine the movement of the lower ends of the resilient member 6 and of the connecting rod 8 to a substantially linear reciprocation. The connecting rod 8 is journalled at its upper end to an eccentric or crank member 11, fixed to a power shaft 12, which shaft is driven from a suitable source of power.

The point of connection 5 of the resilient power-transmitting member 6 to the rocker arm 3 is located relative to the pivot shaft 4 so that during the working stroke of the ram 1 it moves away from the line connecting said pivot shaft and the lower end 7 of the resilient member. That is to say, point 5 moves away from a position of dead center, and the length of the lever arm through which its force is transmitted increases during the working stroke.

Referring to Fig. 1, L designates the forward limit of travel of the ram for a large loaf. S designates its position when traveling forward on its shorter stroke to form a small loaf. S' designates the lever arm through which the pressure of the resilient member 6 is transmitted to the rocker arm 3 when the ram 1 travels through a short stroke in dividing a small loaf. L' designates the lever arm through which the lesser pressure of the resilient member is transmitted when the ram travels through its full stroke in forming a large loaf.

When the end wall P' of the measuring pocket P is set in position X to measure large dough pieces, the ram 1 travels to position L, where the resistance of the dough to further compression becomes sufficient to stop its travel. The rest of the travel of the connecting rod 8 is spent in stretching the resilient member 6, and compressing the spring 6c. Since the ram 1 does not stop until the connecting rod 8 has nearly reached the end of its stroke, the spring 6c is compressed very little and a minimum pull is exerted on the rocker arm 3. This minimum force is effective through the longer lever arm L'. When measuring a small loaf, the end wall P' of the measuring pocket is set in position Y and the ram moves to the left on its working stroke to position S. At this point the pocket is filled with dough and the resistance of the dough stops the ram. The connecting rod 8 continues to travel through its working stroke, stretching the resilient member 6 to a greater extent than in the first instance. Consequently an increased pull is exerted on the rocker arm 3. This increased force, however, is exerted through the shorter lever arm S', so that the resultant effective pressure of the ram on the dough in the pocket can be equal to or less than its pressure on a longer stroke.

Figure 2:
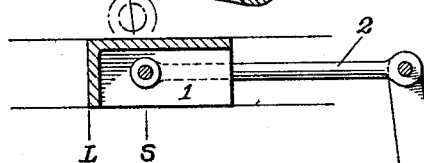
Fig. 2 shows a modified form of the invention which operates in the manner of that shown in Fig. 1.

Fig. 2 shows the ram at the end of the working stroke through which it travels when the machine is measuring a large loaf. In this case the plunger 1 is shown in position L and the resilient connecting member 6 is stretched to a small degree. This construction differs from that of Fig. 1 in that the connecting rod 8 of Fig. 1 is eliminated and the resilient connecting member 6 is journalled directly to the eccentric 11 and is pivotally connected at its other end to the rocker arm 3. The same principle of operation applies, however, in that on the shorter stroke of the plunger to position S, the point of connection 5 of the stretchable rod to the rocker arm travels only to the position indicated by dotted lines, and the greater force of the more highly compressed spring 6c is transmitted to the rocker arm 3 through the lever S'. On the full stroke of the ram 1 to point L, the lesser force exerted through the resilient member 6 is transmitted through the longer lever arm L'.

Figure 3:
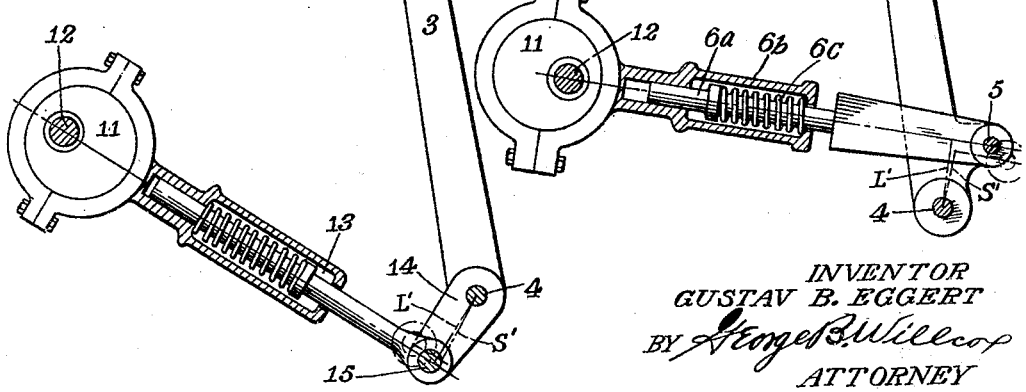
Fig. 3 shows a modified form of the invention differing from that of Figs. 1 and 2 in that the resilient power transmitting element is compressible instead of stretchable.

Fig. 3 shows another arrangement of the mechanical parts according to the principle of the invention. In this case a compressible connecting member 13 is journalled at one end to the eccentric 11 on the drive shaft 12 and is pivotally connected at its other end to a crank member 14 fixed to the rocker arm 3 and extending below the pivot point 4 of the rocker arm. The crank member 14 may of course take the form of an extension of rocker arm 3 beyond the pivot point. In this application of the invention the plunger 1 is shown in position L at its forward limit of travel at the end of a full working stroke when the machine is dividing large loaves, and the small force transmitted by the connecting member 13 is exerted through the longer lever arm L'.

When the plunger is filling a smaller measuring pocket to form smaller loaves, it travels to the left to the position S. In this case the pivoted connection 15 between the resilient connecting member 13 and the crank member 14 travels only to the position indicated in dotted lines, and the increased pressure of the more highly compressed member 13 is exerted through the shorter lever arm S'.

From the foregoing it is apparent that different mechanical assemblies can be used which operate according to the novel principle of the invention.

While I have shown a single plunger, rocker arm, resilient member and eccentric member to illustrate the invention, I do not limit myself to this construction. In practice two or more sets of rocker arms, resilient connecting members and reciprocating drive elements may be employed to actuate the plunger 1 and a plurality of plungers and operating members may also be employed in a single machine. The dividing head (not shown) which contains the measuring pocket may be of any suitable known type, either rotary or reciprocatory.

Variations in the form of rocker arm 3 can be made. For example, referring to Fig. 1, the connection of the rocker arm 3, to the resilient power transmitting member 6 need not be offset from the rocker arm, as shown. The pivot shaft 4 of the rocker arm 3 may be located farther to the right, so that the connection 5 can be located on the center line of the rocker arm 3. Also the member imparting the resilient drive need not be pivoted directly to the rocker arm, but may be journalled to a separate crank arm fixed to a common shaft with the rocker arm.

The essential points of the invention are, first, that the power shall be transmitted from the drive shaft through an operative linkage which includes a resilient power transmitting element of any suitable type; and second, that such linkage shall be operatively connected to the plunger-actuating rocker arm at a point so located with respect to the pivot center of the rocker arm that the force shall be exerted through a lever arm which increases in length as the working stroke of the rocker arm is lengthened. Thus the changing lever is utilized to compensate or overcome the effect of the varying pressure exerted by the resilient member.

Having thus described my invention, what I claim and desire to secure by Letters Patent is:

1. In a dough divider having a reciprocable plunger for charging dough into a measuring pocket, said plunger yieldingly driven so that its working stroke varies with the quantity of dough being measured, in combination, a rocker arm pivoted at one end to a fixed support and connected at its other end to the plunger, resilient actuating means operatively connected to said rocker arm, driving means for imparting reciprocatory motion to said resilient actuating means, the point of connection of said actuating means to said rocker arm being so located relative to the pivot of said rocker arm that said point of connection moves away from a dead center position during the working stroke.

2. In a dough divider having a reciprocable plunger for charging dough into a measuring pocket adjustable in volume, said plunger yieldingly driven so that its working stroke varies with the quantity of dough being measured, in combination, a rocker arm journalled on a fixed pivot, and operatively connected at one end to reciprocate said plunger, an eccentric drive element driven from a source of power, power transmitting means including a resilient element operatively connecting said eccentric element and said rocker arm, its point of connection to said rocker arm being so located relative to the pivot of said rocker arm that said point of connection moves away from dead center during the working stroke, and the force is exerted through a lever arm which becomes longer as the length of the working stroke of the plunger increases.

3. In a dough divider having a reciprocable plunger for charging dough into a measuring pocket adjustable in volume, said plunger yieldingly driven so that its working stroke varies with the quantity of dough being measured, in combination, a rocker arm journalled on a fixed pivot and operatively connected at one end to reciprocate said plunger, an eccentric drive element driven from a source of power, a stretchable resilient member operatively connected at one end to said eccentric shaft to be reciprocated thereby, and at its other end connected to said rocker arm at a point offset from the pivot of said rocker arm and located so that on the working stroke such point of connection to said rocker arm moves away from dead center, whereby the increased tension of the stretchable member during a short working stroke of said plunger is exerted through a short lever arm and during a longer working stroke the decreased pull of said stretchable member is exerted through a longer lever arm.

4. In a dough divider having a reciprocable plunger for charging dough into a measuring pocket adjustable in volume, said plunger yieldingly driven so that its working stroke varies with the volume of said measuring pocket, in combination, an eccentric shaft driven from a source of power, a rocker arm operatively connected at one end to reciprocate said plunger, and pivoted near its other end to a fixed support, a compressible resilient connecting member operatively connected at one end to said eccentric, for endwise reciprocatory motion, and pivotally connected at its other end to oscillate said rocker arm, its point of connection being so located with respect to the pivot of said rocker arm that the effective lever arm, through which the force transmitted by said resilient connecting member is applied to the rocker arm, becomes longer as the length of the working stroke of said plunger increases.

In testimony whereof, I affix my signature.

GUSTAV B. EGGERT.